US012629762B2

(12) United States Patent
Laurain et al.

(10) Patent No.: US 12,629,762 B2
(45) Date of Patent: May 19, 2026

(54) BRAZED COMPONENTS AND IMPROVED METHOD OF MANUFACTURING THEM

(71) Applicants: Hanon Systems, Daejeon (KR); HANON SYSTEMS EFP DEUTSCHLAND GMBH, Bad Homburg v.d. Höhe (DE)

(72) Inventors: Brian Laurain, Troy, MI (US); Michael G. Theodore, Jr., Plymouth, MI (US); Steven White, Pinckney, MI (US); Carl-Hugo Mellander, Bad Homburg (DE)

(73) Assignee: HANON SYSTEMS (KR)

( * ) Notice: Subject to any disclaimer, the term of this patent is extended or adjusted under 35 U.S.C. 154(b) by 0 days.

(21) Appl. No.: 18/926,693

(22) Filed: Oct. 25, 2024

(65) Prior Publication Data

US 2025/0187093 A1     Jun. 12, 2025

Related U.S. Application Data

(60) Provisional application No. 63/612,670, filed on Dec. 20, 2023, provisional application No. 63/608,091, filed on Dec. 8, 2023.

(51) Int. Cl.
| | |
|---|---|
| *B23K 1/00* | (2006.01) |
| *B23K 1/005* | (2006.01) |
| *F24S 50/40* | (2018.01) |

(52) U.S. Cl.
CPC .............. *B23K 1/005* (2013.01); *F24S 50/40* (2018.05)

(58) Field of Classification Search
CPC ...... B23K 1/005; B23K 1/0056; B23K 1/008; F24S 50/40; F24S 20/20
See application file for complete search history.

(56) References Cited

U.S. PATENT DOCUMENTS

| | | | | |
|---|---|---|---|---|
| 3,621,198 A | * | 11/1971 | Horst ....................... | B23K 7/00 607/93 |
| 3,822,692 A | * | 7/1974 | Demarest ................ | F24S 20/40 60/641.15 |

(Continued)

FOREIGN PATENT DOCUMENTS

| | | | | |
|---|---|---|---|---|
| CN | 210267168 U | * | 4/2020 | |
| CN | 210920944 U | * | 7/2020 | |

(Continued)

OTHER PUBLICATIONS

Machine translation of DE4206563A1 (No. date available).*

*Primary Examiner* — Kiley S Stoner

(74) *Attorney, Agent, or Firm* — Shumaker, Loop & Kendrick, LLP; James D. Miller

(57) ABSTRACT

A modular pod for performing a brazing process includes a housing defining an interior thereof, a vacuum device in selective fluid communication with the interior of the housing with the vacuum device configured to selectively form a vacuum within the interior of the housing, a first energy source disposed external to the interior of the housing, and a first energy access feature provided through the housing. The first energy access feature forms a pathway for transferring energy from the first energy source to the interior of the housing for heating a workpiece disposed therein in accordance with the brazing process. A heat conductive gas is selectively fluidly communicated to the interior of the housing following formation of the vacuum therein with the heat conductive gas aiding in transferring heat energy to the workpiece during the brazing process.

7 Claims, 6 Drawing Sheets

(56) References Cited

U.S. PATENT DOCUMENTS

| | | | |
|---|---|---|---|
| 4,575,608 A | | 3/1986 | Wictorin et al. |
| 4,657,169 A * | | 4/1987 | Dostoomian ........ B23K 1/0056 |
| | | | 228/103 |
| 4,677,473 A * | | 6/1987 | Okamoto .......... G01N 21/8806 |
| | | | 356/613 |
| 2002/0139794 A1 | | 10/2002 | Budinger |
| 2003/0178394 A1 * | | 9/2003 | Johnson ............... B23K 1/0053 |
| | | | 219/85.13 |
| 2013/0319507 A1 * | | 12/2013 | Hasin ..................... H10F 77/63 |
| | | | 136/246 |
| 2013/0333384 A1 * | | 12/2013 | Chou ........................ F03G 7/00 |
| | | | 60/641.8 |
| 2015/0090768 A1 * | | 4/2015 | Kuroda .................. B23K 1/008 |
| | | | 228/46 |
| 2021/0053132 A1 * | | 2/2021 | Ding ..................... B23K 26/03 |

FOREIGN PATENT DOCUMENTS

| | | | | |
|---|---|---|---|---|
| CN | 115747854 A | | 3/2023 | |
| DE | 4206563 A1 * | | 9/1992 | ........... B23K 1/0056 |
| DE | 19716757 A1 * | | 10/1998 | ....... B29C 66/91411 |
| DE | 19913813 A1 * | | 10/2000 | ......... G02B 19/0023 |
| EP | 0201325 A2 * | | 11/1986 | ......... H05K 13/0465 |
| JP | 05096366 A * | | 4/1993 | |
| JP | 2004358484 A | | 12/2004 | |
| JP | 2014143304 A | | 8/2014 | |
| JP | 2017020087 A | | 1/2017 | |
| KR | 20100110116 A * | | 10/2010 | ............ F24D 3/005 |
| KR | 101227637 B1 | | 1/2013 | |
| RU | 2088388 C1 * | | 8/1997 | ............... F21V 7/09 |
| WO | WO-9518694 A1 * | | 7/1995 | |

* cited by examiner

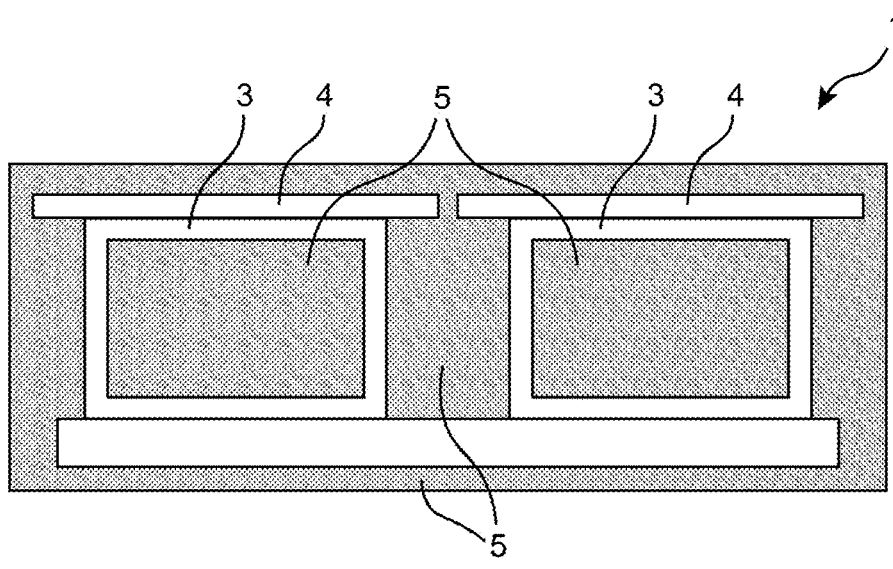
FIG. 1 - PRIOR ART
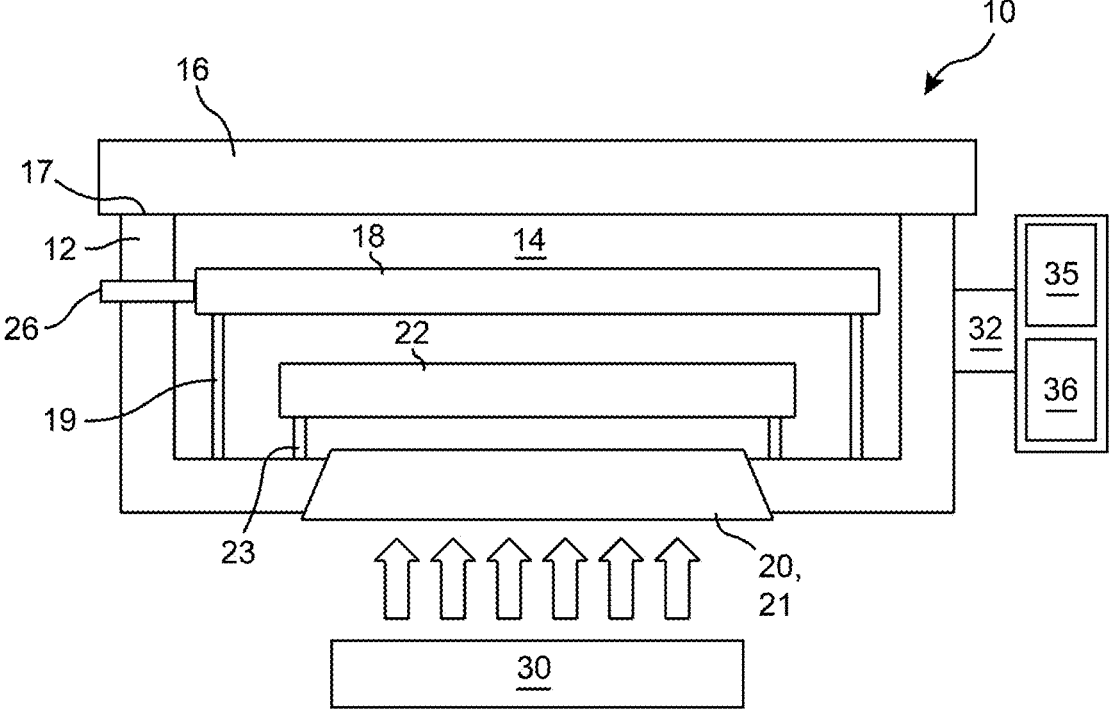
FIG. 2

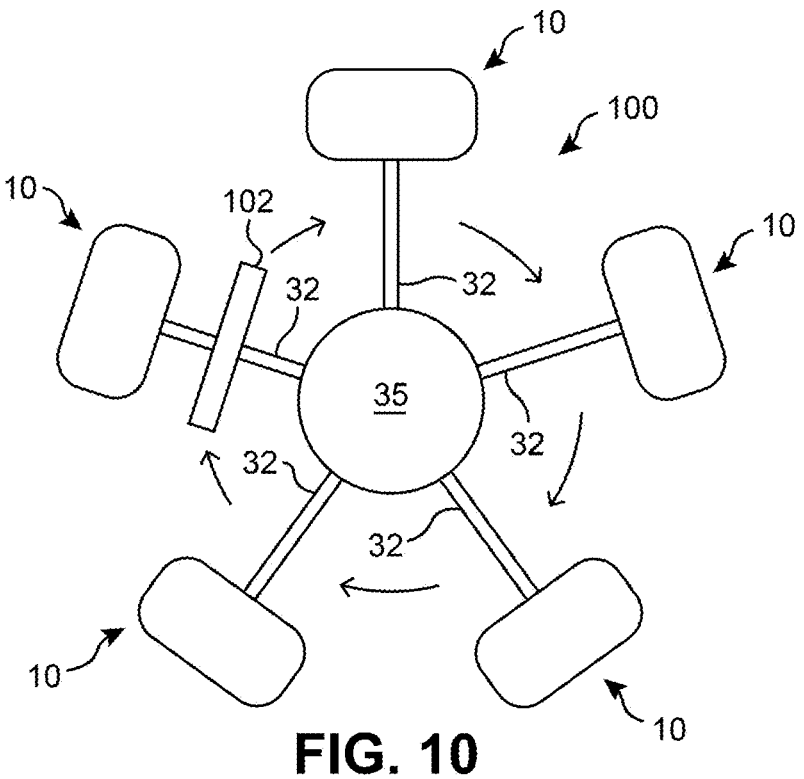
FIG. 10
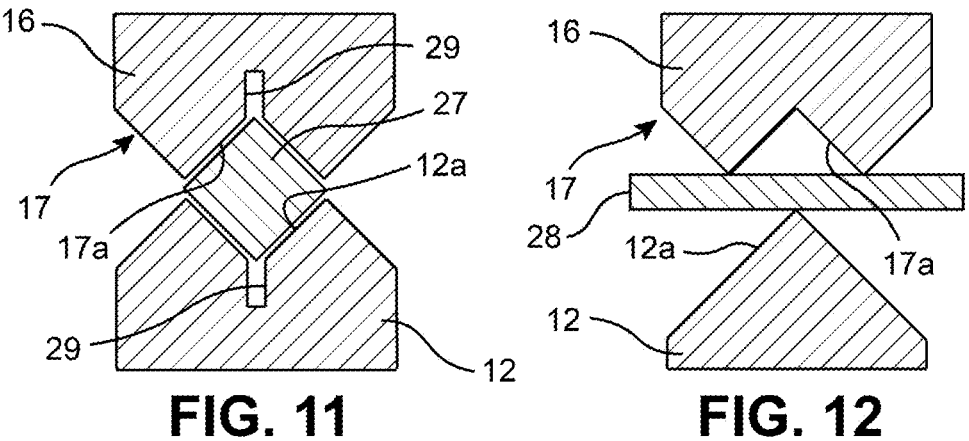
FIG. 11          FIG. 12

BRAZED COMPONENTS AND IMPROVED METHOD OF MANUFACTURING THEM

CROSS-REFERENCE TO RELATED APPLICATION

This patent application claims priority to each of U.S. Provisional Patent Application Ser. No. 63/608,091, filed on Dec. 8, 2023, and U.S. Provisional Patent Application Ser. No. 63/612,670, filed on Dec. 20, 2023, the entire disclosures of which are incorporated herein by reference in their entireties.

FIELD OF THE INVENTION

The present invention relates to a brazing method and system, and more particularly, to a brazing method and system that utilizes a plurality of modular pods in which an independent brazing process may occur with respect to a work piece in each respective pod via the controlled transfer of energy, including focused solar energy, into each respective pod.

BACKGROUND OF THE INVENTION

Brazing techniques are widely used to join multiple components, such as heat exchangers (HEX), fluid transport pipelines, and fluid distribution manifolds, into single, cohesive structures. These components are typically joined using a Controlled Atmosphere Brazing (CAB) furnace, which employs a controlled environment to facilitate the brazing process. In this process, a nitrogen ($N_2$) atmosphere is maintained to purge oxygen ($O_2$) and water vapor ($H_2O$) from the furnace, ensuring the integrity of the brazed joints. However, the current state of the art presents several challenges, primarily related system efficiency, flux usage, furnace maintenance, and environmental impact.

For example, in order to maintain the desired purging of the oxygen and water vapor, some CAB methods can require the use of high quantities of the displacing fluid, such as utilizing as much as 120 $m^3$/hr of nitrogen to maintain desired properties within the CAB furnace. The CAB furnace must also be maintained at high temperatures, such as about 600° C., via the combustion of natural gas or the use of electrical power, each of which may be associated with undesirable emissions of carbon dioxide ($CO_2$). When considering the fact that some components require as long as 30 minutes per component to successfully complete the brazing process, such material and energy consumption can become both inefficient and costly.

Another concern relating to use of such a CAB process is associated with the inefficiencies arising from the common presence of a significant amount of dead space within such a CAB furnace. For example, FIG. 1 schematically illustrates an interior of a CAB furnace 1 having a conveyor belt 2 as a transport means with fixtures 3 disposed thereon for mounting respective workpieces 4 thereto. The shaded areas 5 are representative of dead spaces 5 within the interior of the CAB furnace 1 that receive the displacing nitrogen therein for circulation around and about the remaining components 2, 3, 4, whereby such nitrogen must also be heated to the temperature necessary for performing the brazing process on each of the workpieces 4. The CAB furnace 1 is accordingly space inefficient (occupying a larger facility volume or floor space than is desirable), requires a higher rate of nitrogen introduction to consistently displace the oxygen and water vapor, and requires additional energy to maintain a heating of this increased rate of nitrogen introduction therein. The use of excessive materials and energy in heating such materials accordingly leads to additional costs and carbon dioxide emissions, each of which is preferably avoided. These factors, when combined with the need for extensive preventive maintenance (PM) to maintain operation of the CAB furnace, significantly impacts both production and cost efficiency. For example, the CAB furnace may need to be shut down for up to one month to properly perform a complete cleaning, further exacerbating production delays and increasing costs associated with the use of the CAB process.

The use of flux within the CAB furnace also introduces additional concerns. Fluxes are commonly applied to clean the joined surfaces of oxides, promoting improved wetting action of the filler metal, which is essential for forming reliable brazed joints. While fluxes provide excellent wetting capabilities, their excessive use results in flux residues on the components. These residues can mix with the fluids passing through the associated components during operational use thereof, leading to the formation of undesirable substances within such components, such as chemical sludges. Such sludges are particularly problematic when they pass through lubricated mechanical systems, as they cause a loss of lubricity and, consequently, lead to accelerated wear. Additionally, the sludge can clog fluid passages, leading to malfunctions and, in extreme cases, system failures. As another example, in hydrogen fuel cell systems, flux residues can act as contaminants, potentially poisoning the system and causing operational breakdowns or system failures. Reducing the amount of flux used during brazing is thus highly desirable, as it would lower material costs and minimize the risk of such system contamination.

Ideally, a flux-free brazing process would eliminate the formation of sludge and other harmful residues. While flux-free brazing can be performed in a CAB furnace, this process is particularly challenging and costly. Achieving a flux-free environment requires maintaining oxygen levels at extremely low concentrations, typically in the range of 20 parts per million (PPM) or less. The current state of the art involves the use of oxygen scrubbing techniques, such as graphite "muffles" and heated titanium (Ti) strips, to reduce the oxygen concentration in the furnace. More specifically, such a graphite muffle may be provided to absorb the oxygen and decompose the oxygen into an inert carbon dioxide, which may be followed by the titanium strips being heated to incandescence to scrub the remaining oxygen, thereby converting the strip to titanium oxide ($TiO_2$).

Although flux-free brazing in a CAB furnace is technically feasible, it is difficult to achieve due to the meticulous maintenance required and the high cost of the necessary consumables. The aforementioned scrubbing processes are not only expensive, but also require frequent replacement of consumable materials, further increasing the operational costs and making the process unsustainable for many manufacturers. Additionally, maintaining the extremely low oxygen concentration necessary for flux-free brazing is both labor-intensive and prone to errors.

The environmental impact of the current brazing methods is another significant concern. The use of natural gas or electricity to heat CAB furnaces generates substantial carbon dioxide emissions. Moreover, the cryogenic processes used to produce the displacing nitrogen involve the liquefaction of air, which is an energy-intensive operation with a low coefficient of performance (COP). As a result, the current brazing processes are far from carbon neutral (CN) and present significant environmental challenges.

Given the difficulties associated with maintaining flux-free brazing environments, the high material and energy costs, and the significant environmental impact of the current CAB furnace processes, there is a clear need in the art for an improved brazing method. Such a method would eliminate the need for fluxes, reduce material and energy consumption, minimize carbon dioxide emissions, and provide a more efficient, cost-effective, and environmentally friendly solution for joining components in a variety of applications.

SUMMARY OF THE INVENTION

Compatible and attuned with the present invention, an improved method and apparatus for performing a brazing process that is flux-free, reduces material and energy consumption, and minimizes carbon dioxide emissions has surprisingly been discovered.

According to an embodiment of the present invention, a modular pod for performing a brazing process is disclosed, the pod comprising a housing defining an interior thereof, a vacuum device in selective fluid communication with the interior of the housing with the vacuum device configured to selectively form a vacuum within the interior of the housing, a first energy source disposed external to the interior of the housing, and a first energy access feature provided through the housing. The first energy access feature forming a pathway for transferring energy from the first energy source to the interior of the housing for heating a workpiece in accordance with the brazing process.

According to another embodiment of the present invention, a modular pod brazing system includes a plurality of modular pods with each of the modular pods having a housing defining an interior thereof and configured to receive a workpiece therein for performing a brazing process within the interior of the corresponding modular pod. A solar collection system is configured to collect and redirect solar radiation, and more specifically, is configured to redirect a portion of the collected solar radiation towards each of the modular pods. The corresponding portion of the collected solar radiation redirected towards each of the modular pods is converted to heat energy utilized in performing the brazing process with respect to the workpiece disposed within the corresponding modular pod.

A method of performing a flux-free brazing process is also disclosed. The method comprises the steps of: providing a pod having a housing defining an interior thereof, the interior of the housing receiving a workpiece therein, the workpiece provided devoid of flux material thereon; forming a vacuum within the interior of the housing; and transferring energy from a first energy source disposed external to the interior of the housing to the interior thereof by way of a first energy access feature of the pod following the forming of the vacuum within the interior of the housing, the energy transferred to the interior of the housing by way of the first energy access feature providing heat energy to the interior of the housing for performing the flux-free brazing process with respect to the workpiece.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings:

FIG. 1 is a schematic representation of an interior of a CAB furnace having a relatively high volume of dead space that must be occupied and heated in accordance with a brazing process performed according to the prior art.

FIG. 2 is a schematic representation of a modular pod utilized in conducting a flux-free brazing process with respect to a workpiece according to an embodiment of the present invention.

FIG. 10 is a schematic top view of a modular pod brazing system according to another embodiment of the invention wherein a shade is moveable relative to a stationary array of the modular pods.

FIG. 11 is an elevational cross-sectional view of a diamond-shaped metal seal fitting suitable for sealing an interior of the modular pod according to a first implementation.

FIG. 12 is an elevational cross-sectional view of a sheet-like metal seal fitting suitable for sealing an interior of the modular pod according to a second implementation.

DETAILED DESCRIPTION OF THE INVENTION

Figures 3, 4:
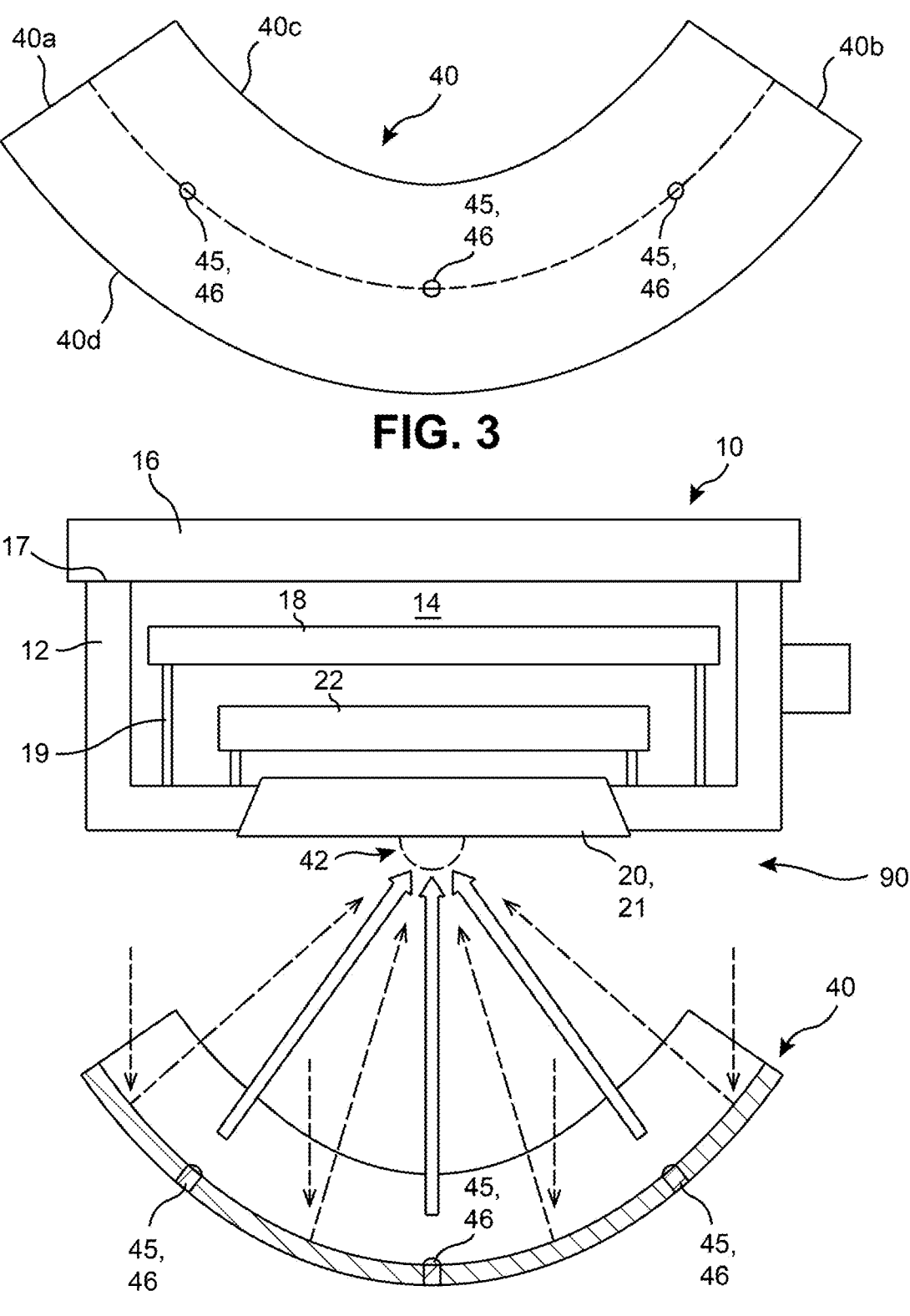
FIG. 3 is a top plan view of a parabolic solar collector having secondary energy emitters integrated therein according to an exemplary implementation of the present invention.
FIG. 4 is a schematic representation of the modular pod of FIG. 2 when solar radiation or laser energy associated with the parabolic solar collector of FIG. 3 acts as an energy source in conducting a brazing process within the pod.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on. All values provided for the dimensions of certain features of the invention should also be understood to be subject to typical manufacturing inconsistencies and therefore may be associated with corresponding manufacturing tolerances, hence the resulting features of a manufactured article of the invention may include dimensions that vary from those listed herein in accordance with such manufacturing tolerances while remaining within the scope of the present invention.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present invention is drawn towards a new manufacturing process and system for producing high-quality brazed joints, which can be applied in both fluxed and flux-free brazing techniques. Unlike the traditional continuous CAB furnace method, the disclosed process involves manufacturing brazed components in discrete individual (modular) containers, referred to as "pods" 10 hereinafter. The use of the pods 10 eliminates the need for the continuous flooding of a furnace with a displacing gas, such as nitrogen, which is traditionally supplied at a rate of over 100 m$^3$ per hour. This not only reduces material usage, but also presents opportunities for cost savings and process simplifications over the current state of the art.

FIG. 2 schematically illustrates one of the pods 10 according to an embodiment of the present invention. The pod 10 includes a housing 12 defining an interior 14 thereof. The housing 12 includes an interior access structure 16 for gaining physical access to the interior 14 of the housing 12, such as when loading or unloading a workpiece 18 associated with a brazing process performed thereon when disposed within the pod 10. The interior access structure 16 may generally refer to any structure that is moveable or otherwise adjusted to provide selective access to the interior 14 of the housing 12, such as a suitable access door, access panel, or the like. In the present embodiment, the pod 10 may be arranged in an upright position where the interior access structure 16 forms or defines an upper portion or surface of the housing 12 to allow for vertical insertion and/or removal of a corresponding workpiece 18 relative to the interior 14 by way of the interior access structure 16. When so positioned, the interior access structure 16 may be referred to a lid 16 of the housing 12, whereby the lid 16 may be adjustable or replaceably removable from the remainder of the housing 12 when gaining access to the interior 14 of the housing 12, such as by an upward vertical adjustment or removal of the lid 16 from a rim or lip 17 of the housing 12 defining a periphery of an opening into the interior 14 and then a downward vertical adjustment or replacement of the lid 16 relative to the rim or lip 17. With respect to the upright configuration discussed above, the rim or lip 17 may be formed on a substantially horizontal plane having a shape and configuration mating with the lid 16 for enclosing the interior 14 in a fluid tight and sealed manner.

The pod 10 further includes an energy access feature 20 providing a means for energy that is produced or gathered exterior to the interior 14 of the housing 12 via an energy source 30 to be transferred or transported into the interior 14 of the housing 12 for supplying the heat energy necessary to perform a brazing process within the pod 10 in accordance with the present invention. In the illustrated embodiment the energy access feature 20 is a window 21 that is configured to allow certain forms of energy originating or being redirected by the energy source 30, such as electromagnetic energy, to pass therethrough for transferring said energy to the contents of the interior 14 of the housing 12, including but not limited to the workpiece 18 undergoing the brazing process within the pod 10. The window 21 is provided to allow for such energy to pass therethrough in a first direction while also having a sealed relationship relative to the housing 12 for preventing the undesired loss of heat energy from within the interior 14 in a second opposing direction, such as by undesired removal of a heat transferring gas from within the interior 14, as discussed in greater detail hereinafter. The window 21 may be provided from a material that allows for certain frequencies of electromagnetic energy, such as visible light, to pass therethrough for entry into the interior 14, while also preventing other forms of electromagnetic energy, such as infrared light, from escaping the interior 14 by way of passage through the window 21, as is commonly understood according to the greenhouse effect. The window 21 may be transparent or semi-transparent to facilitate the passage of visible light therethrough. Although not pictured, the window 21 may be associated with a lens or other means of focusing such energy when reaching the window 21 in order to focus or direct such energy at a desired position or intensity within the interior 14, as desired. Although FIG. 2 illustrates a single window 21, the present invention may alternatively utilize a plurality of distinct windows 21 with each of the windows 21 associated with the reception of a portion of the energy being directed into the interior 14, such as directing different beams of energy towards different portions of the workpiece 18 in a manner promoting a uniform distribution of heat generation relative to the workpiece 18.

The embodiment shown in FIG. 2 further includes a heating structure (plate) 22 disposed within the interior 14 at a position configured to receive the energy passing through the window 21 in a manner causing such energy to be absorbed by the heating plate 22 and converted to thermal or heat energy of some form, which can then be transferred directly to the workpiece 18 itself, or to any other heat transfer materials (such as inert gases, discussed hereinafter) disposed within the interior 14 and in heat exchange relationship with the workpiece 18. More specifically, where a vacuum is present within the interior 14, the primary or exclusive means of heat transfer from the heating plate 22 to the workpiece 18 may occur via radiative heat transfer, whereas the inclusion of other heat-conducting materials within the interior 14 (hence in the absence of a vacuum) may result in such heat being transferred from the heating plate 22 to the workpiece 18 via any combination of conduction, convection, and/or radiative heat transfer. It is also conceivable that some embodiments may include direct contact between the heating plate 22 and the workpiece 18 to encourage conduction directly therebetween in the absence of an intervening gas or the like, as desired. The heating plate 22 may be positioned within the interior 14 via a fixture 23 or the like associated with the housing 12. In some alternate embodiments, the energy may be transferred into the interior 14 of the pod 10 in the absence of the heating plate 22 such that the energy directly heats the workpiece 18 and/or any heat transfer gases disposed within the interior 14, as desired.

The workpiece 18 may be positioned within the interior 14 at a position between the heating plate 22 and the lid 16 to facilitate placement and/or removal of the workpiece 18 from within the interior 14 while also positioning the energy source 30, the window 21, and the heating plate 22 to an opposing side of the workpiece 18, thereby preventing interference of the heat transferring or generating structures with the process of loading or unloading the workpiece 18 relative to the pod 10. The workpiece 18 may be positioned within the interior 14 by way of a fixture 19 or the like associated with the housing 12. Due to the modular nature of each of the pods 10, the fixture 19 utilized in mounting the workpiece 18 may be specifically designed and dimensioned for use with the specific workpiece 18 instantaneously being brazed, and such fixtures 19 may be removably coupled to the pod 10 to facilitate the manufacture of various different components with respect to a commonly configured pod 10 construction.

In some embodiments, the pod 10 may include one or more thermocouples 26 that are in heat exchange relationship with the workpiece 18 in a manner allowing for a direct temperature measurement of the workpiece 18 to be made during an ongoing brazing process. This is in contrast to the circumstances faced during use of a CAB furnace, wherein direct temperature monitoring of the workpieces passing through the CAB furnace and precise temperature control along such workpieces is not feasible. Specifically, the CAB furnace may include the periodic determination of a workpiece temperature profile of one or more areas of an associated workpiece disposed within a fully loaded CAB furnace, and may then adjust a furnace temperature profile within the CAB furnace in an attempt to suitably adjust the determined workpiece temperature profile with respect to the one or more areas thereof being monitored. Sometimes, special braze frames are also required to reduce or increase heating in specific areas of the workpiece passing through the CAB furnace (to prevent over or under heating). This process of indirectly adjusting work piece temperature profile is very inefficient, time consuming, and imprecise. With the pod brazing approach disclosed herein, multiple vacuum tight feedthroughs of the thermocouples 26 can be used to directly measure and control the temperature of the corresponding workpiece 18 with respect to multiple measured positions, whereby use of such thermocouple(s) 26 allows for real-time monitoring and adjustment of the heating process, thereby ensuring a more efficient and accurate brazing process. The thermocouple 26 shown in FIG. 2 is shown as measuring the temperature of a portion of the workpiece 18, but such thermocouples 26 may alternatively or additionally be provided to measure a temperature profile of any structure disposed within the interior 14 of the pod 10 and responsible for heating the workpiece 18, such as monitoring the temperature profile of various positions along the heating plate 22 or any form of heat exchanger disposed in the interior 14 and in direct or indirect heat exchange relationship with the workpiece 18, as desired.

The pod 10 further includes at least one fluid communication port 32 configured to remove fluids (gases) from within the interior 14 and/or to introduce fluids (gases) into the interior 14, depending on the brazing process being utilized with respect to the pod 10 and the components fluidly coupled to the corresponding fluid communication port 32. The fluid communication port 32 is shown in the embodiment of FIG. 2 as being associated with a vacuum device 35 configured to remove, by suction through the fluid communication port 32, any gases disposed within the interior 14 prior to initiation of a brazing process. Under such circumstances, the fluid communication port 32 may alternatively be referred to as a vacuum port 32, and may be utilized where it is desired to form a vacuum within the interior 14 of the pod 10 that avoids interaction of the workpiece 18 with oxygen or water vapor that was previously disposed within the interior 14 prior to the evacuation of the interior 14 and resulting formation of the vacuum.

According to some embodiments of the present invention, the brazing process may occur during the formation of the vacuum with the interior 14 of the pod 10, which may be referred to as a vacuum brazing process herein. The vacuum brazing process may be flux-free and may include the use of filler metal(s) disposed appropriately within the workpiece 18 or may include the use of diffusion bonding between components of the workpiece 18, as desired. As mentioned above, the vacuum brazing process may largely depend upon radiative heat transfer occurring during a heating of the heating plate 22 via the energy source 30 due to the lack of heat conductive materials present within the interior 14 of the pod 10 during formation of such a vacuum.

The fluid communication port 32 is further shown in FIG. 2 as being associated with a source of heat conductive gas 36, which may refer to any suitable heat-conductive gas that does not negatively impact the brazing process or otherwise interact negatively with the workpiece 18 or any components exposed to the heat-conductive gas when circulating within the interior 14 of the pod 10. Preferable heat-conductive gases may include nitrogen ($N_2$) or hydrogen ($H_2$), although other gases such as argon (Ar) or helium (He) may conceivably be introduced into the pod to enhance the heat transfer in accordance with the present invention. The described process may utilize one such gas or a combination of such gases, as desired. Although FIG. 2 shows the pod 10 as including a single fluid communication port 32 that may be switchable relative to the vacuum device 35 and the source of heat conductive gas 36, such as by a suitable valve arrangement (not shown) it should be readily understood that any number of the fluid communication ports 32 may be utilized in communicating any number of gases to and/or from the interior 14, including the use of an independent port 32 with respect to each corresponding vacuum device 35 and each corresponding source of heat conductive gas 36 in selective fluid communication with the pod 10, as desired. However, as explained hereinafter, it may be advantageous to utilize only a single fluid communication port 32 that is in selective fluid communication with any number or combination of vacuum devices 35 and/or sources of heat conductive gas 36, such as by way of a suitable valve arrangement (not shown) and/or any associated components (not shown) responsible for the formation of the vacuum and/or the pressurization of a heat transfer gas at positions exterior to the fluid communication port 32. The use of a single such port 32 beneficially requires that only one fluid access point into or out of the interior 14 of the pod 10 is in need of selective sealing when the pod 10 is moved, adjusted, replaced, undergoing maintenance, or the like, as discussed in detail hereinafter when describing the configuration of an array of the pods 10 forming a modular pod brazing system 100 according to the present disclosure.

The manner in which the present invention utilizes a plurality of discrete pods 10, which are each relatively small and easy to prototype, manufacture, manipulate, adjust, and/or maintain in comparison to a production-scale CAB furnace, allows for a greater flexibility of design in attempting to adjust the configuration of each of the pods 10 in accordance with the specific characteristics of each respective workpiece 18 and/or each desired brazing process to be performed on each respective workpiece 18. That is, pods 10 of various sizes and configurations may be produced with each pod 10 specifically directed towards the reception of one or more corresponding workpieces 18 therein that are dimensioned appropriately for reception within each of the respective pods 10 while minimizing the dead volume within the interior 14 of the pod 10 and/or the spacing present between relevant components, such as between the lid 16 and the workpiece(s) 18, between the workpiece(s) 18 and the heating plate 22 (where applicable), and/or between the heating plate 22/workpiece(s) 18 and the window 21. That is, each of the pods 10 need not be wastefully produced to accommodate a large variety of differing components that may require a brazing process, as would be expected with a large-scale CAB furnace. As described hereinafter, the pods 10 may also be replaceable or additive/removable in a manner wherein the scale of production can be easily adjusted via the selection of which pods 10 and/or the number of such pods 10 of a specific type to utilize in forming a corresponding pod brazing system 100.

In addition to spacing components more closely and providing improved heat transfer properties as a result, one clear advantage of the use of the modular pod 10 in place of the CAB furnace relates to the manner in which the limited amount of open or dead space provided within the interior 14 of the pod 10, as facilitated by the customization of such pods 10 to specific requirements of the workpiece(s) associated therewith and/or the associated brazing processes occurring therein, provides numerous advantages in efficiently carrying out the method according to the present invention. For example, the limited dead space results in less gas that must be evacuated with forming a vacuum within the interior 14, which allows for extremely rapid evacuation of the interior 14 while utilizing minimized energy, as both the time and the volume of gas that must be moved in achieving such a vacuum are minimized in comparison to the continuous displacement of gases present within a larger system, such as the CAB furnace. In similar fashion, those (flux-free) brazing processes requiring the addition of a desired quantity of heat-conductive gas following formation of the vacuum, such as the described nitrogen ($N_2$) or hydrogen ($H_2$), may also occur in a relatively rapid manner while reducing the material consumption of the corresponding heat-conductive gas. This is true not only because of the reduced volume within the pod 10, but also because there is not a need for a continuous stream of such gases to be introduced into the interior 14 of the pod 10 to maintain the desired brazing conditions, as the interior 14 may be selectively sealed following the formation of the vacuum and/or following the introduction of the appropriate quantity of heat conductive gas, which can continue to heat up to the desired temperature upon entering the interior 14 and receiving additional energy from the energy source 30 by way of the window 21.

Another advantage inherent to the use of such a heat conductive gas in place of a vacuum relates to the manner in which the heat conductive gas is able to reach a relatively homogenous temperature within the interior 14 as a result of the convective and conductive properties thereof, which leads to all exposed surfaces of the workpiece 18 being subjected to a relatively similar or the same temperature within the interior 14 of the pod 10 in a manner promoting a uniform heat transfer to the workpiece 18, a more homogenous composition of any brazed surfaces of the workpiece 18, and thus a higher quality part at the completion of the brazing process.

The manner in which each of the pods 10 may be produced to include a minimized volume and resulting dead space relative to a workpiece 18 suitable for use therewith also promotes the ability to utilize a corresponding heat conducting gas as a form of cooling agent relative to the workpiece 18 and/or the heated components of the associated pod 10 via the ability to rapidly remove and/or introduce gases into the relatively small volume pod 10. That is, at the completion of a corresponding flux-free brazing process, the interior 14 of the pod 10 will include one of a vacuum or a quantity of high temperature heat conductive gases therein. Where a vacuum is present, a corresponding fluid communication port 32 in fluid communication with a source of heat conductive gas that is lower in temperature than the workpiece 18 and/or heated components within the interior 14 of the pod 10 (such as the heating plate 22 or any other associated heat exchange structures) may be opened to introduce the relatively low temperature heat conductive gas into the previously vacuum sealed interior 14 to rapidly cool the workpiece 18 and/or internal components of the pod 10 via gas quenching. Alternatively, where a heat conductive gas was utilized as a heat conductor during the associated brazing process, the vacuum device 35 may first be utilized to remove the relatively high temperature heat conductive gas from the interior 14 of the pod 10 prior to introduction of the relatively low temperature heat conductive gas acting as cooling agent via a corresponding source of heat conductive gas 36 in selective fluid communication with the interior of the pod 10, whereby the rapid cooling of the workpiece 18 again occurs via gas quenching.

This rapid cooling of the interior 14 of the pod 10 allows for a beneficial dual function process of cooling the workpiece 18 to a temperature where it can be safely removed from the interior 14 of the pod 10 while simultaneously imparting a heat treatment quench to the workpiece 18 that allows for increased strength with respect to certain metal alloys, often through implementation of a post-braze natural aging, artificial aging, or tempering heat treatment. For workpieces 18 including aluminum or alloys thereof in particular, the use of a vacuum or a low pO2 gas atmosphere within the interior 14 of the pod 10 further allows for the use magnesium containing alloys during a flux-free brazing process, as magnesium containing aluminum alloys cannot be used in CAB brazing furnaces due to the poisoning effect of magnesium on potassium-aluminum-fluoride brazing fluxes. For flux-free aluminum brazing applications, magnesium containing aluminum alloys may be used, which provides an additional benefit of increased age hardening response after completion of the flux-free brazing process. Additionally, the added material strength created by said rapid cooling and post-braze heat treatment processes allows the workpieces 18 to be made of thinner material, thereby reducing the cost of materials and the mass of the resulting part. The added material strength of the rapid cooling process can also yield completed parts that can tolerate increased operating temperatures. For example, where the workpiece 18 is a high temperature heat exchanger or pipeline, the workpiece 18 can be produced at zero additional cost with the added strength imparted by the rapid cooling and post-braze heat treatment process.

The modular nature of the pods 10 also allows for ease of disconnection and/or reconnection of each of the pods 10 to any external systems necessary for operation of each respective pod 10 in the manner described herein. For example, each pod 10 may be provided with any necessary fixtures, fittings, or ports associated with communicating a gas to or from the interior 14 of the pod 10, such as by the described fluid communication port 32, or communicating energy associated with the energy source 30 to or from the interior 14 of the pod 10, such as any piping, conduits, electrical conductors (cables, cords, busbars, etc.), or the like, depending on the energy transfer method. Each of the pods 10 may thus be individually removed or added to a system having one or more of the pods 10 associated therewith in a rapid and interchangeable manner facilitating customization of the associated system, including the use of pods 10 associated with the manufacture of differently sized or configured workpieces 18 present within the same modular pod system such that manufacturing of multiple distinct parts requiring unique brazing conditions may be accomplished on any desired scale and in any desired combination concurrently and independently. Such a capability also reduces down time associated with such a system as each pod 10 that is not operating optimally for any reason, such as when routine maintenance is required or one or more components of the pod 10 becomes damaged or worn, is able to be addressed individually while the remaining pods 10 continue typical operation, including the complete removal of one of the pods 10 from the associated system for transport and remote repair or maintenance while maintaining operation of any remaining pods 10.

In summary, the use of the pod 10 as shown and described thus offers the ability to reduce the time to form a vacuum therein, the time to (optionally) introduce a heat-conductive gas therein at a desired quantity, the amount of dead space present within the interior 14 of the pod 10, the amount of heat-conductive gases that are (optionally) introduced into the interior 14 to conduct a brazing process, the time required to heat any such (optional) heat-conductive gases to a desired temperature, the energy consumed in heating the workpiece 18 appropriately via the energy source 30, the costs of all consumable materials utilized according to the associated brazing process, the undesirable emissions resulting from the expenditure of energy and/or materials in performing the brazing process, the floor space or volume necessary to perform the desired brazing process, the time required to clean or maintain each pod 10, the amount of labor required to clean and/or maintain the pod 10 in comparison to a CAB furnace, the cycle time at which the workpiece 18 is subjected to the relatively high temperatures associated with the brazing process, and the total cycle time of performing all necessary steps to complete such a brazing process from start to finish. With respect to certain components formed from specific materials, such as those formed from aluminum or alloys thereof, the reduction of the time the workpiece 18 is heated within the pod 10 can further reduce an incidence of over aging/annealing of such materials when exposed to high temperatures, where such over aging/annealing can lead to a significant loss of strength in such materials. The present invention accordingly eliminates situations wherein an especially strong material must be selected based on the assumption that a strength thereof will be lowered as a result of a suitable brazing process causing such over aging/annealing of the selected material, thereby resulting in a part of only adequate strength despite the need to initially utilize what is potentially a more costly or more difficult to produce high strength material. The disclosed process accordingly allows for the use of a greater variety of potentially low cost and relatively low strength materials in comparison to traditional processes as may be carried out with a CAB furnace.

The described advantages associated with the use of the modular pods 10 disclosed herein also leads to the ability to utilize alternative, uncommon, and/or environmentally friendly energy sources 30, 45 while maintaining an efficiency of the associated brazing process. According to one particularly advantageous feature of the present invention, the energy associated with the (primary) energy source 30 of one of the pods 10 may be solar radiation (sunlight) that is directed into the interior 14 of the pod 10 via the window 21. The solar radiation is then able to heat the heating plate 22 within the interior 14 of the pod 10 to facilitate the desired flux-free brazing process. As mentioned previously, when a vacuum brazing process is utilized, the heating plate 22 is heated in a manner wherein the workpiece 18 is heated via radiative heat transfer as a result of the lack of a heat exchanging medium present within the vacuum between the heating plate 22 and the workpiece 18 (assuming there is no direct heat conductive contact present therebetween). In contrast, when a heat conductive gas is utilized within the interior 14 during the associated flux-free brazing process, the heat transfer mechanism may be any combination of convective, conductive, and radiative, as desired.

As shown in FIGS. 3 and 4, the use of the solar radiation as the energy source 30 may include the use of a solar collector 40 configured to reflect and focus a first area of solar radiation encountering the solar collector 40 to a relatively smaller second area (or point position) of the solar radiation such that the intensity of the solar radiation is increased at the second area in comparison to the first area. Such a solar collector 40 may be what is traditionally referred to as a (concentrating) parabolic solar collector 40 having at least one surface with a parabolic shape along at least one plane extending through the solar collector 40, wherein the parabolic shape concentrates the solar radiation encountering the parabolic shape to a focal point or focal region 42 along the parabolic plane that is associated with the higher intensity solar radiation. FIG. 3 illustrates one exemplary solar collector 40 that includes a parabolic shape along at least two perpendicular planes such that any parallel-arranged rays or beams of solar radiation encountering the solar collector 40 may be reflected to a single focal point or region 42 regardless of the position that the solar radiation encounters the parabolic surfaces forming the solar collector 40. In the example of FIG. 3, the solar collector 40 is shown as having a first parabolic shape curving around an axis extending into the page as the solar collector 40 extends from a first edge 40a to an opposing second edge 40b as well as a second parabolic shape curving around an axis represented by a dashed line disposed intermediate a third edge 40c and an opposing fourth edge 40d while following the parabolic curvature of the first parabolic shape. However, the parabolic curvature shown and described is not intended to be limited to the illustration of FIG. 3, as any number of concave arcuate shapes for concentrating such solar radiation may be utilized in focusing such solar radiation in accordance with the present disclosure. For example, the solar collector 40 may alternatively be produced to be substantially dish or bowl shaped via the use of an axially symmetric parabolic shape that concentrates and focuses solar radiation from all positions surrounding a central axis thereof to a focal point or region 42 disposed along the central axis at a distance from the surface of the collector 40 in accordance with the axially symmetric parabolic shape.

The solar collector 40 of FIG. 3 is further provided with a secondary energy source 45 that may be utilized to supplement the (primary) energy source 30 formed by the focused solar radiation under circumstances where such solar radiation is not sufficiently available or capable of providing the necessary heat energy, such as during cloud cover, rain, or the like where the sun is partially or fully obstructed or dimmed. The secondary energy source 45 of the illustrated example includes one or more energy emitters 46 integrated into the structure of the solar collector 40 with each of the energy emitters 46 oriented such that the energy emitted therefrom is directed along an axis towards the previously described focal point or region 42, which in the present example includes each of the energy emitters 46 being directed at angles perpendicular to the surface of the solar collector 40 at the position of each of the corresponding emitters 46 in a manner coinciding with the direction any reflected solar radiation encountering the solar collector 40 would be redirected when encountering the parabolic surface at the corresponding position. In the present example, each of the energy emitters 46 may be representative of a laser 46 that directs energy at the focal point or region 42 to supplement the beam of the solar radiation formed by the solar collector 40 when not suitably intense to create the heat within the corresponding pod 10 in accordance with the desired brazing process. However, alternative energy generating or directing devices capable of directing heat producing energy at a desired position may be utilized in place of the described one or more lasers 46 without departing from the scope of the present invention.

FIG. 4 illustrates a cross-section of a simplified assembly 90 comprising one of the pods 10 and a corresponding solar collector 40 having the secondary energy source 45 in the form of the one or more energy emitters 46 for supplying the heat energy to the interior 14 of the pod 10 by way of the window 21 thereof, wherein the described simplification of the assembly 90 is associated with the manner in which the solar collector 40 is positioned and oriented such that the focal point or region 42 associated with the parabolic shape(s) of the solar collector 40 is found at the position of the window 21 of the pod 10 absent any reflection, redirection, or further focusing/dispersion of the solar radiation following the concentrating thereof by the solar collector 40, which is generally unlikely to occur in application due to factors such as the variable angle at which the solar radiation strikes the solar collector 40 and/or the infeasibility of positioning the pod 10 and solar collector 40 relative to the incoming solar radiation in the manner depicted. However, FIG. 4 does illustrate the general concept of the present invention relating to the focusing of the solar radiation at a specific focal point or region 42 that is associated with the solar radiation entering the interior 14 of the pod 10 by way of the window 21 and rapidly heating the heating plate 22 as a result of the heightened intensity of the focused solar radiation.

Specifically, FIG. 4 shows how a plurality of parallel arranged rays of solar radiation (depicted by the thin and dashed arrows) are reflected symmetrically towards the centrally located focal point or region 42 while the energy emitters 46 are oriented perpendicular to the surface of the collector 40 in which they are housed to result in the energy emitted therefrom (depicted as thicker outlined arrows) being directed at the same focal point or region 42, thus allowing for the energy emitters 46 to provide a similar effect as the focused solar radiation when supplied with the necessary energy to perform the desired brazing process. The disclosed assembly 90 may include the exclusive use of the focused solar radiation when appropriate (preferably), the exclusive use of the energy emitters 46 when the solar radiation is generally unavailable (as a result of weather or the like), or the combined use of the solar radiation and the emitted energy where the solar radiation is only partially capable of delivering the necessary energy to the interior 14 of the pod 10.

Although the assembly 90 shows only the single solar collector 40 directed towards the single window 21 of the pod 10, it should be readily apparent that the present invention is not limited to any specific number of the solar collectors 40 and/or the windows 21 with respect to each pod 10, as any number or combination of such features may be utilized in achieving a desired intensity of solar radiation at any number of positions of the windows 21 relative to the pod 10, such as utilizing one solar collector 40 that produces a beam of solar radiation that is later divided among a plurality of spaced apart or independently provided windows 21, providing a solar collector 40 to corresponding to each of a plurality of the windows 21, or utilizing multiple solar collectors 40 that are associated with directing the solar radiation to one or fewer of the windows 21 for generating a relatively higher energy level, as non-limiting examples.

Figure 5:
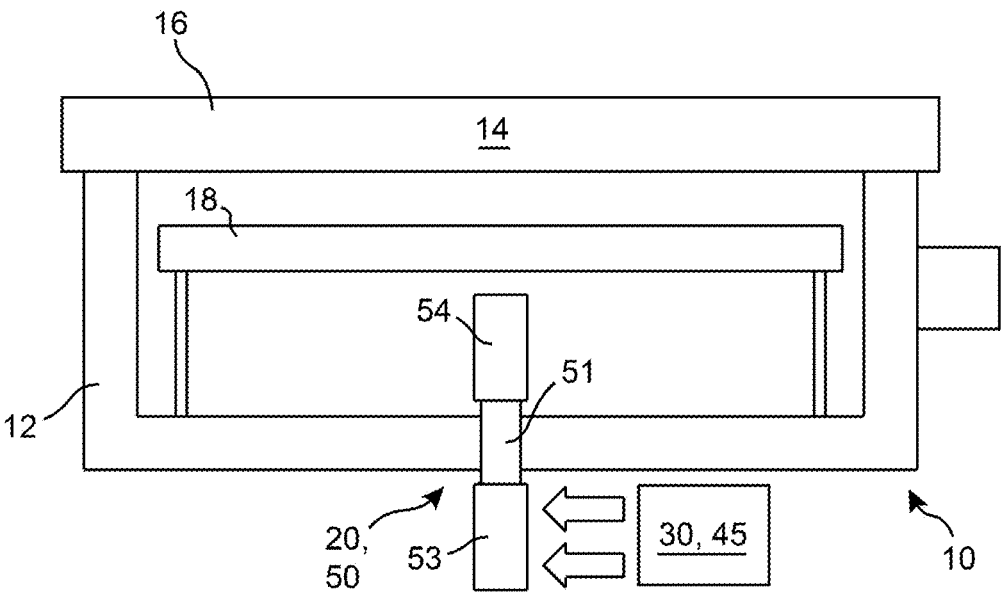
FIG. 5 is a schematic representation of a modular pod having an energy source associated with a heat pipe in heat exchange relationship with the interior of the pod according to an embodiment of the present invention.

FIG. 5 illustrates one exemplary modification of the pod 10 where the energy access feature 20 is not necessarily the light passable window 21, but is instead provided as a fluid conduit 51 of a heat pipe 50, wherein the fluid conduit 51 passes through the housing 12 of the pod 10 such that the heat energy carried by a corresponding heat exchange fluid of the heat pipe 50, which is initially positioned outside of the interior 14 of the pod 10, can be transported or communicated into the interior 14 of the pod 10 by way of the fluid conduit 51. More specifically, the heat pipe 50 may include a first heat exchanger 53 disposed outside of the interior 14 of the pod 10 and a second heat exchanger 54 disposed within the interior 14 thereof, wherein the fluid conduit 51 fluidly couples the first and second heat exchangers 53, 54 to one another. The first heat exchanger 53 may be an evaporator of the heat pipe 50 wherein heat energy encountering the first heat exchanger 53, such as from one or both of the primary and/or secondary energy sources 30, 45 as described herein, is transferred to the heat exchange fluid within the first heat exchanger 53 to heat and potentially evaporate the heat exchange fluid before the heat exchange fluid passes to the second heat exchanger 54 by way of the fluid conduit 51. Assuming that the pod 10 is associated with the use of one of the heat conductive gases in performing a brazing process following formation of the initial vacuum within the interior 14 of the pod 10, the second heat exchanger 54 acts as a form of condenser wherein the heat energy carried by the heat exchange fluid within the second heat exchanger 54 is transferred through the second heat exchanger 54 to the heat conductive gases while within the interior 14 of the pod 10, thereby cooling and potentially condensing the heat exchange fluid while heating the heat conductive gases encountering the second heat exchanger 54 to an increased temperature. The heated heat conductive gases are then circulated within the interior 14 of the pod 10 to lead to the substantially uniform heating of the workpiece 18 disposed therein in the manner described hereinabove.

In some embodiments, the disclosed heat pipe 50 may be associated with the use of the solar radiation as the primary energy source 30, even where the window 21 is not provided to allow for entry of the solar radiation into the interior 14 of the pod 10 in the manner disclosed. Such a configuration may include the first heat exchanger 53 acting in the same manner as the disclosed heating plate 22 wherein a beam of the solar radiation strikes the first heat exchanger 53 (or an associated structure thereof mimicking the heating plate 22) and increases the temperature thereof. This increase in temperature results in heat energy being transferred to the heat exchange fluid disposed within the heat pipe 50, which is then released to the second heat exchanger 54 when passing therethrough, which in turn leads to a heating of any heat conductive gases or components that come into contact with the second heat exchanger 54.

The method of heat transfer associated with the described heat pipe 50 is not necessarily limited to the disclosed linear configuration having only the one fluid conduit 51 for connecting the first and second heat exchangers 53, 54 through the housing 12 of the pod 10 in accordance with a traditional heat pipe 50 configuration, as any form of fluid circuit allowing for heat transfer between an exterior disposed first heat exchanger 53 and an interior disposed second heat exchanger 54 in a manner transferring heat energy to the workpiece 18 may be utilized while remaining within the scope of the present invention, including the use of a pair of the fluid conduits 51 that circulate the heat exchange fluid between the inlet and outlet ends of each of the first and second heat exchangers 53, 54 in a circulating fashion for performing the disclosed form of heat transfer from the corresponding energy source 30, 45 to the interior of the pod 10.

Alternative methods of providing heat energy to the first heat exchanger 53 for eventual transfer to the second heat exchanger 54 and then the heat conductive gases within the interior 14 of the pod 10 may be utilized in addition to the described use of solar radiation. Additional examples include the use of a process occurring external to the interior 14 of the pod 10, such as the combustion of a corresponding fuel and/or the initiation of an exothermic reaction in a manner wherein heat generated by such processes is capable of being transferred sequentially to the first heat exchanger 53, the heat exchange fluid, and then the second heat exchanger 54.

Figure 6:
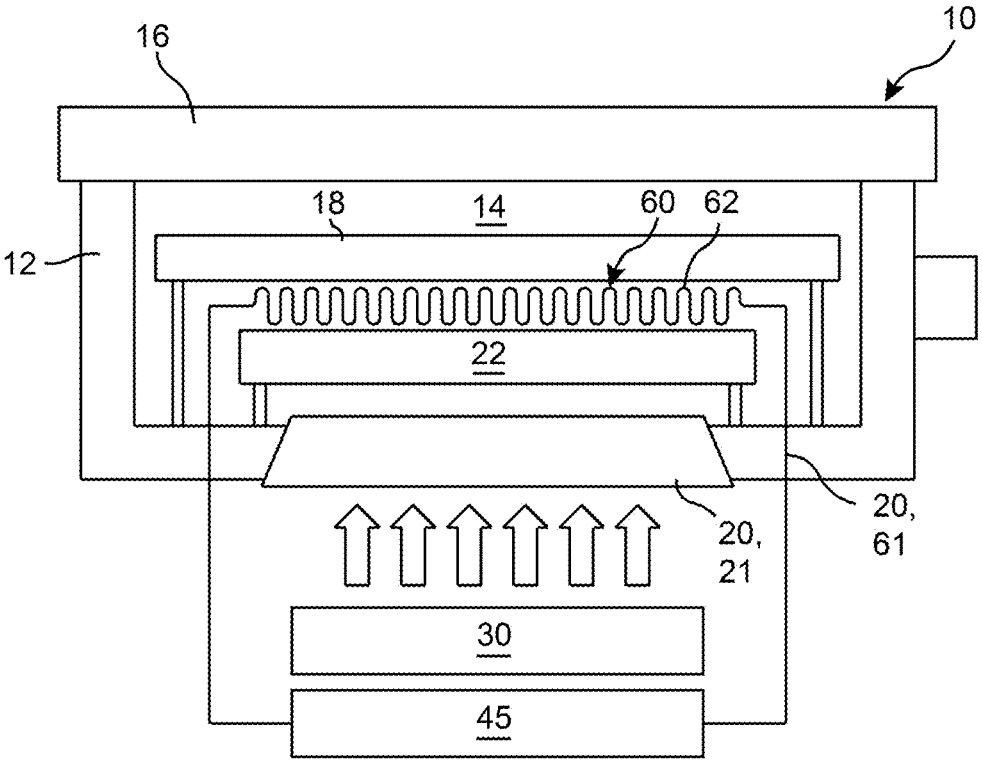
FIG. 6 is a schematic representation of a modular pod utilizing a primary energy source and a secondary energy source associated with an electrical heating device in heat exchange relationship with the interior of the pod according to an embodiment of the present invention.

FIG. 6 illustrates yet another modification of the pod 10 wherein an electrical energy source 60 is associated with another example of one of the energy access features 20 by way of one or more electrical conductors 61 that extend through the housing 12 from an exterior thereof to the interior 14 thereof, thereby allowing for the use of electrical energy within the interior 14 of the pod 10 for selectively adding heat energy thereto. The electrical conductors 61 may be provided in any form, including being provided as wires, cables, cords, busbars, terminal blocks, etc. that conduct electrical energy therethrough. In the embodiment of FIG. 6, the secondary energy source 45 is an electrical energy source (such as the electrical grid or a suitable battery) and the electrical conductors 61 are associated with transferring electrical energy through a heating device 62 disposed within the interior 14 of the pod 10. The heating device 62 may be configured to provide radiative heat transfer relative to the workpiece 18 when a vacuum brazing process is utilized, or may be configured to provide a combination of radiative, convective, and conductive heat transfer relative to the workpiece 18 when one of the heat conductive gases is utilized in accordance with the present disclosure. The heating device 62 may be representative of any form of electrical heating element utilizing any method of generating heat from electricity, such as utilizing resistance heating, inductive heating, or electrical arc heating, as non-limiting examples.

If electrical energy is utilized as the primary or secondary energy source 30, 45, it may be preferable to utilize electrical energy that is produced in a carbon neutral (low emission) or renewable manner, such as utilizing hydroelectric energy, wind energy, stored solar energy, and/or geothermal energy. Another example of a carbon neutral approach may include the use of an electrical generator utilizing a biofuel, such as biodiesel or ethanol.

One particularly advantageous method of supplying electrical energy and/or heat energy in accordance with either of the described energy sources 30, 45 as depicted in either of FIGS. 5 and 6 may include the use of a hydrogen fuel cell (HFC) that utilizes hydrogen ($H_2$) in performing an exothermic reaction therein. The use of the HFC is particularly advantageous because the same hydrogen that may be utilized in flooding the interior 14 of the pod 10 may also be associated with operation of the HFC, thereby allowing for a dual usage of such hydrogen in performing multiple associated processes with respect to operation of the pod 10. That is, the same hydrogen that is capable of circulating within the pod 10 as the heat conductive gas during a brazing process may be removed from the pod 10, such as by the fluid communication port 32, and may then be stored to be recycled for subsequent use within a corresponding HFC also associated with the pod 10, thereby resulting in another carbon neutral production method. The exothermic reaction that occurs within the HFC with respect to such hydrogen allows for the HFC to be utilized as either or both of a heat energy source and/or an electrical energy source in accordance with any of the examples described in reference to FIGS. 5 and 6 since the operation of the HFC generates both an electric current and waste heat, each of which may be associated with multiple methods of heating the interior 14 of the pod 10 as described herein with reference to the various energy sources 30, 45.

Any of the disclosed energy sources 30, 45 may alternatively be associated with exchanging heat energy with one of the heat conductive gases that is introduced into the interior 14 of the pod 10 following the formation of the vacuum therein such that the heat conductive gases are heated to a temperature greater than that of the workpiece 18 upon entering the pod 10. For example, the source of heat conductive gas 36 and/or the associated fluid communication port 32 may be associated with a heat exchanger assembly whereby heat generated according to any of the energy sources 30, 45 and methodologies described herein is transferred to the heat conducting gas prior to entry into the interior 14 of the pod 10. Such a heat exchanger assembly may be similar to that described with reference to the use of the first heat exchanger 53, the second heat exchanger 54, and any associated fluid conduits 51 extending therebetween, wherein the first heat exchanger 53 is associated with an energy source 30, 45 (such as receiving a beam of solar radiation for heating the first heat exchanger 53), the fluid conduit(s) convey a heat exchanging fluid heated within the first heat exchanger 53 to the second heat exchanger 54, and the second heat exchanger 54 is in heat exchange relationship with the port 32 and/or the source of heat conductive gas 36 for transferring the heat energy to the heat conductive gas prior to entry into the interior 14 of the pod 10. If such a configuration is utilized, the corresponding fluid communication port 32 may this be representative of one of the described energy access features 20 promoting a transfer of energy from outside the interior 14 of the pod 10 to the interior 14 thereof for performing a brazing process.

The specific examples shown and described with reference to any of FIGS. 2 and 4-6 are not meant to be limiting to the present invention, as substantially any one or any combination of the different energy sources 30, 45 and/or energy access features 20 may be incorporated into a corresponding one of the pods 10 without necessarily departing from the scope of the present invention, and such energy sources 30, 45 may be configured to provide the heat energy to the interior 14 of the pod 10 according to substantially any control scheme relative to such energy access features 20, including associating any of the described energy sources 30, 45 as the primary energy source 30 or as the secondary energy source 45, switching a priority of the energy sources 30, 45 depending on the circumstances, or switching which of the energy access features 20 is employed in communicating energy into the pod 10. Any of the described energy sources 30, 45 and or energy access features 20 may also be utilized independently in a desired sequence or may be utilized simultaneously for having a desired effect, as desired.

Figure 7:
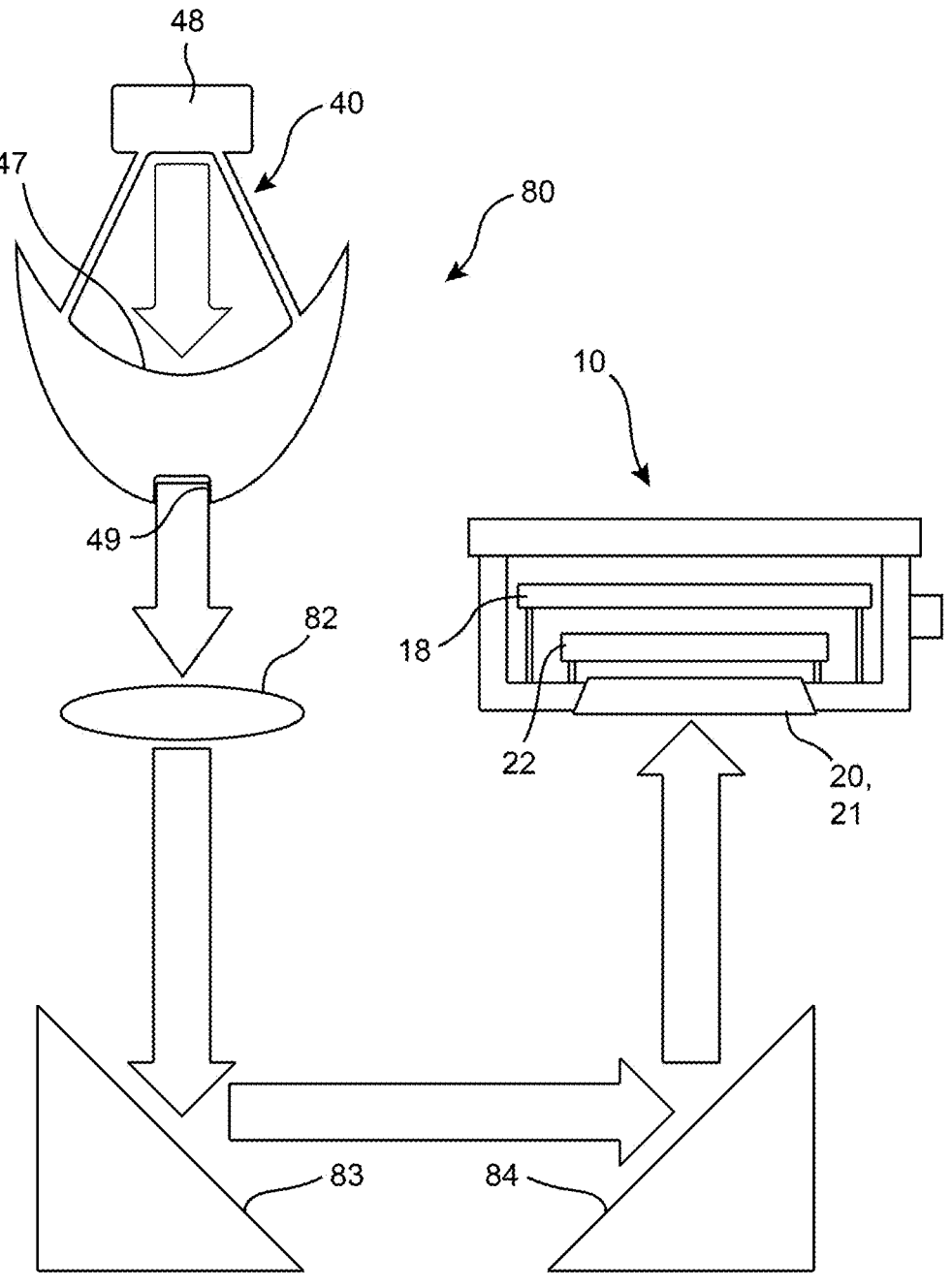
FIG. 7 is a schematic representation of a solar collection system configured to direct solar radiation towards a corresponding pod for generating heat therein.

Referring now to FIG. 7 with a renewed emphasis on the use of solar radiation as the primary or secondary energy source 30, 45, a solar collection system 80 for collecting the solar radiation and directing the solar radiation towards a predefined position relative to one of the pods 10 is disclosed, wherein the predefined position relative to the one of the pods 10 may refer to a beam of the solar radiation entering the interior 14 of the pod 10 by way of the window 21 (as shown in FIG. 7), or the beam of the solar radiation striking the first heat exchanger 53 external to the pod 10 for subsequent transfer of heat thereto, depending on the instantaneous configuration of the pod 10 and method of operation thereof. Specifically, the use of a pathway for directing and redirecting the solar radiation as shown in FIG. 7 may be utilized with respect to either method while remaining within the scope of the present invention as the window 21 and/or the first heat exchanger 53 can be positioned relative to the solar collection system 80 for encountering the beam of the solar radiation in a desired fashion.

The solar collection system 80 generally includes an exemplary solar collector 40, a lens 82, a first reflector 83, and a second reflector 84. The solar collector 40 as depicted includes a parabolic surface 47 that concentrates the solar radiation encountering the parabolic surface 47 via reflection towards a central disposed collector/reflector 48 that redirects the solar energy in a generally downward direction towards the lens 82, which may include the beam of the collected solar radiation passing through a central opening 49 formed along a central axis of the parabolic surface 47 to bypass the parabolic surface 47 when directed towards the lens 82. The lens 82 is configured to further focus and/or disperse the beam of solar radiation, depending on the circumstances. For example, the lens 82 may be provided to further focus the solar radiation reflected from the collector/reflector 48 of the solar collector 40 into a higher intensity beam or may be provided to divide the beam into a plurality of discrete beams that are in turn directed towards individual ones of the pods 10, as the circumstances may warrant. The solar collection system 80 may thus include the use of any number of the lenses 82 at any desired positions along the solar radiation pathway for achieving the desired intensity, direction(s), and surface area covered by any beam(s) exiting any such lenses 82.

The first reflector 83 redirects the beam of light striking the first reflector 83 from a vertical downward direction to a horizontal (rightward in FIG. 7) direction before the second reflector 84 redirects the beam of light striking the second reflector 84 from the horizontal direction to the vertical upward direction coinciding with the position of a corresponding pod 10. The disclosed configuration may include the reflectors 83, 84 being disposed below a surface on which the corresponding pod 10 is supported such that the beam of redirected solar radiation may enter the pod 10 from below (in a vertical upward direction) via the window 21 being disposed on an underside thereof, or may alternatively heat a corresponding first heat exchanger 53 (not shown in FIG. 7) that is similarly positioned under the pod 10 and in the pathway of the solar radiation. However, it should be readily apparent that the disclosed configuration of the reflectors 83, 84 is non-limiting, as the illustrated solar collection system 80 may be one of any number of suitable configurations of routing such solar radiation in a desired manner towards the corresponding pod 10 via any number of reflections/redirections and any number of occurrences of focusing or dispersing such beams, including the use of fewer or greater reflectors, as well as the use of any positioning of the window 21 and/or the first heat exchanger 53 relative to the structure of the pod 10 and any surrounding components of the solar collection system 80. It is also conceivable that the solar collection system 80 may be associated with multiple solar collectors 40 that are configured to collect and redirect the solar radiation according to any number of different control schemes, including any number of the solar collectors 40 directing the solar energy to any combination of the pods 10, such as multiple solar collectors 40 combining to heat one of the pods 10, one of the solar collectors 40 being associated with heating a plurality of the pods 10, or one or more solar collectors 40 that are adjustable in heating a variable number or combination of such pods 10.

The solar collection system 80 as shown and described may also include any of the associated solar collectors 40, lenses 82, and corresponding reflectors 83, 84 being adjustable in position and/or angular orientation to account for circumstances such as the movement of the sun across the sky (and the resulting change in angular orientation of the solar radiation encountering the solar collector(s) 40), a desire to switch an operational mode of one or more of the pods 10, and/or a desire to direct one of the beams towards a specific position relative to one of the pods 10 for performing a specific brazing process wherein the position at which the solar radiation encounters the pod 10 and any associated components is relevant to properly completing the associated brazing process. A switching of the mode of operation of one of the pods 10 may refer to the discontinuation or initiation of the beam of solar radiation being directed towards a corresponding structure of the pod 10 such as the window 21 or the first heat exchanger 53 when acting as a form of external heating plate. For example, one of the pods 10 may include a combination of a window 21 and a first heat exchanger 53 of a heat pipe 50 that are disposed at different positions encounterable by the beam of solar radiation generally directed towards the one of the pods 10, wherein an adjustment of a feature such as the disclosed second reflector 84 is capable of determining which of the components 21, 53 encounters the beam, or wherein an adjustment of a corresponding lens 82 disperses such a beam to encounter one or both such components 21, 53 according to a desired intensity of each resulting beam.

Figure 8:
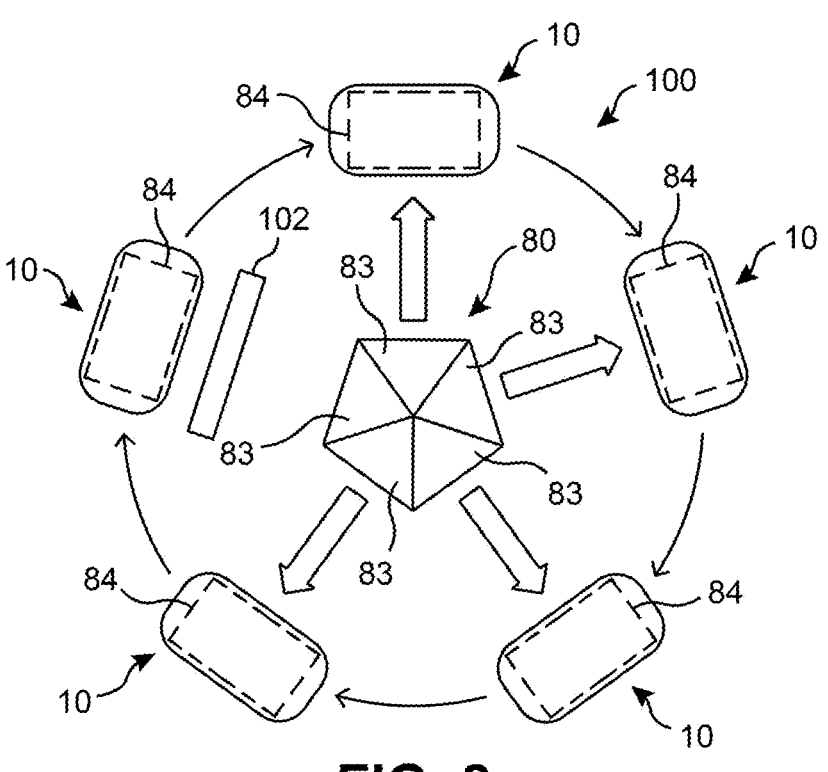
FIG. 8 is a schematic top view of a modular pod brazing system having an annular array of the pods that orbit relative to stationary components of the modular pod brazing system according to an embodiment of the present invention.

The solar collection system 80 for collecting and directing the solar radiation is further shown in FIG. 8 as being implemented into a modular pod brazing system 100 having an annular array of the pods 10 each having an energy communication relationship with the solar collection system 80. The system 100 is shown as including five of the pods 10 disposed radially at equal angular intervals relative to a center of the array of the pods 10, but any number of angularly spaced pods 10 may form the array of the system 100 while remaining within the scope of the present invention. The solar collection system 80 may include the solar collector 40 and the lens 82, as depicted in FIG. 7, being disposed along a central axis of the array of the pods 10 for directing the beam of solar radiation collected and reflected by the solar collector 40 towards one of a plurality of centrally located and angularly displaced first reflectors 83, each of which is in turn configured to direct each corresponding beam horizontally towards a corresponding second reflector 84, wherein each respective second reflector 84 then redirects the corresponding beam back upwards towards the window 21 or first heat exchanger 53 associated with the corresponding pod 10. In some embodiments, the lens 82 may be configured to disperse the beam of solar radiation received from the solar collector 40 into the necessary number of beams associated with the array of the pods 10, as desired. However, alternative methods of distributing and/or combining the beams may be utilized, including the use of an independent solar collector 40 that is associated with each assembly including one of the first reflectors 83, one of the second reflectors 84, and one of the pods 10, as desired. The module brazing system 100 according includes the ability to direct the solar radiation at a plurality of the pods 10 simultaneously via common components forming the described solar collection system 80 with respect to each of the pods 10.

Figure 9:
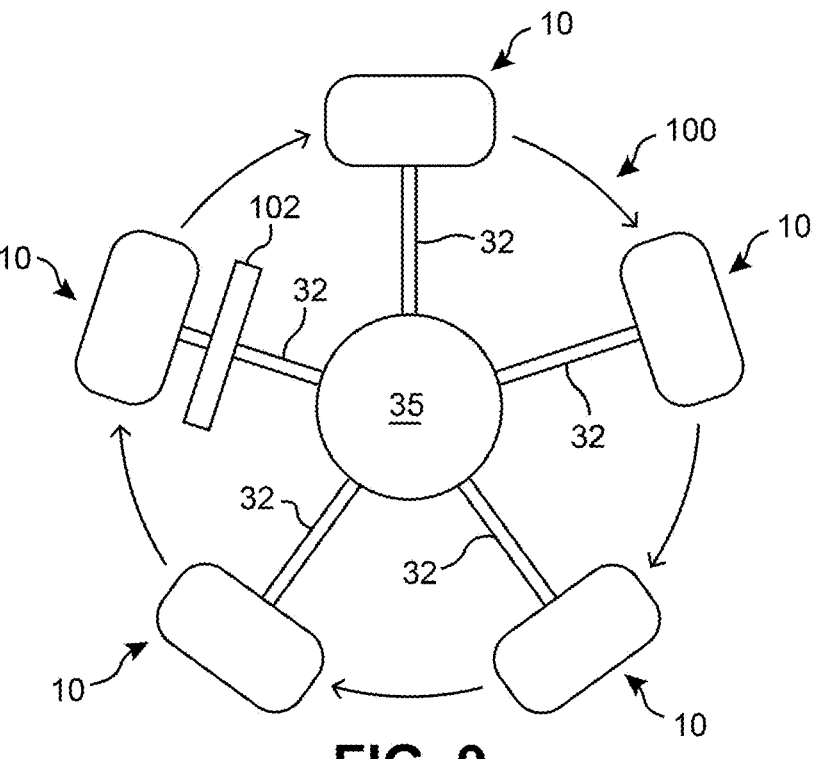
FIG. 9 is a schematic top view of the modular pod brazing system of FIG. 9 showing a configuration of fluid conveying components of the modular pod brazing system that remain stationary relative to the orbiting array of pods.

The modular pod brazing system 100 is shown in FIG. 9 at a vertical position below the central array of the first reflectors 83 of FIG. 8 such that a vacuum device 35 common to each of the pods 10 forming the array is centrally disposed below the first reflectors 83 and equally spaced radially from each of the pods 10. The vacuum device 35 is in fluid communication with each of a plurality of radially extending fluid communication (vacuum) ports 32 that are angularly displaced relative to the center of the system 100 such that each of the vacuum ports 32 is arranged to be fluidly coupled to a radially aligned one of the pods 10. The vacuum device 35 may alternatively or additionally be representative of the source of the heat conductive gas 36, which may similarly be fluidly coupled to each of the pods 10 forming the array where such brazing process utilizing such a gas are desirable. The radially extending fluid communication ports 32 may be representative of two or more independently provided fluid communication ports 32 associated with the vacuum device 35 and the source of heat conductive gas 36, respectively, where a common pathway for the different processes is not utilized.

As shown in FIGS. 8 and 9, the system 100 may include the array of the pods 10 coupled to an orbiting or rotating platform or structure (not shown) such that each of the pods 10 can change the angular position thereof relative to the solar collection system 80 and/or the underlying fluid conveying components 32, 35, 36, thereby aligning different ones of the pods 10 with different ones of the reflector pairs 83, 84 corresponding to different beams of solar radiation as well as different ones of the pods 10 with different ones of the radially extending fluid communication ports 32 associated with forming the vacuum and/or distributing the heat conductive gases to the pods 10. The stationary positioning of such fluid conveying components 32, 35, 36 results in a need for a releasable sealed connection between an end of each of the fluid communication ports 32 and a corresponding fitting, fixture, opening, or the like associated with the housing 12 of the pod 10, such as the use of releasable rotary seals that release a pod 10 and port 32 sealed connection each time an orbiting of the pods 10 is occurring and that then reconnects the pod 10 and port 32 sealed connection each time the pods 10 are repositioned in a stationary manner.

The system 100 shown in FIGS. 8 and 9 is further associated with at least one shade 102 having a position and configuration suitable for adjustably blocking the solar radiation directed towards a corresponding one of the radially disposed pods 10. That is, the shade 102 maintains a fixed position relative to the rotating/orbiting pods 10 such that the shade 102 is capable of obstructing the solar radiation directed towards the instantaneously radially aligned one of the pods 10 in order to cease the transfer of the solar radiation to the aligned one of the pods 10, such as when it is desirable to unload a completed part, to load a new workpiece 18, to prevent an overheating of the interior 14 of the pod 10, to perform maintenance on one of the pods 10, or combinations thereof. The position radially aligned with the shade 102 may accordingly be representative of a loading/unloading position of the system 100. The shade 102 may also be adjustable when at the stationary position thereof to allow for the aligned one of the pods 10 to receive the solar radiation when it is desirable to utilize the loading/unloading position for performing a brazing process such that all positions around the system 100 may efficiently be utilized simultaneously.

The shade 102 may also be adjustable in a manner wherein the solar radiation is only partially obscured (lowering the intensity of the solar radiation) or wherein only a portion of the solar radiation directed towards a specific position relative to the pod 10 is obscured to a desired degree, such as obscuring portions of the solar radiation directed at portions of the workpiece 18 where additional heating is no required or where overheating is potentially occurring. Specifically, the shade 102 may be associated with dampening features that locally control the degree of radiation obstruction occurring along certain areas of the shade 102, such as adjusting localized vanes (not shown) or similar structures for adjusting a percentage of the solar radiation passing by such localized vanes, or otherwise adjusting the transparency or opaqueness of the shade 102 along selected regions thereof. When utilized in conjunction with one or more of the thermocouples 26 described hereinabove, such shades 102 may be adjusted in real time to provide a smooth and precisely controlled change in temperature at selected positions along the workpiece 18 and/or a corresponding heating plate 22 (or equivalent), thereby promoting a desired temperature profile of the workpiece 18 with respect to time while also preventing situations where any portion of the workpiece 18 may be subjected to especially high temperatures for an extended period of time in a manner potentially leading to the undesirable over aging or over annealing of the workpiece 18 described above with regards to aluminum and alloys thereof.

Although only one shade 102 is shown in FIGS. 8 and 9, it should be understood that any number of the pods 10 may be associated with such a shade 102 for controlling the solar radiation reaching any combination of the shaded pods 10, as desired. The shade 102 also need not be positioned in radial alignment with the corresponding pod 10, as any positioning of the shade 102 along the pathway taken by the solar radiation among features of the solar collection system 80, such as an alternative positioning of the shade 102 relative to the reflectors 83, 84 thereof, may be utilized without departing from the scope of the present invention.

FIG. 10 illustrates an alternative configuration of the system 100 wherein each of the pods 10 remain stationary and one or more of the shades 102 are configured to orbit or rotate relative to the pods 10 for selectively obscuring any of the radial positions of the pods 10 distributed about the solar collection system 80. Such a configuration may provide the advantage in comparison to those disclosed in FIGS. 8 and 9 as a result of the lack of need for continual releasing and then reconnecting of any sealed connections associated with any fluid conveying components 32, 35, 36, thereby eliminating the need for additional fittings, fixtures, couplings, or the like necessary for achieving such repeated disconnections and reconnections. Such an adjustable shade 102 may result in any of the positions of the pods 10 being associated with loading a workpiece 18, unloading a finished part, removal of a pod 10 for remote attention, reinsertion of a pod 10 following remote attention, or on-site repair or maintenance of a pod 10, as desired. One disadvantage of this configuration, however, is that such processes may need to be performed with respect to multiple positions around the system 100, as opposed to a dedicated position where an operator can remain relatively stationary while addressing an aligned pod 10 according to the embodiment shown in FIGS. 8 and 9.

Referring now to FIGS. 11 and 12, the manner in which the interior 14 of each of the pods 10 is placed under vacuum at some point during the flux-free brazing process results in a circumstance where a particularly effective seal may be required at the junction of a sealing surface 17a disposed about the rim or lip 17 of the lid 16 and a sealing surface 12a disposed about a periphery of an opening into the interior 14 of the pod 10 to prevent the entry of ambient environment into the pod 10, which can be destructive to the desired flux-free brazing process being conducted therein. Additionally, because the temperatures within the interior 14 of the pod 10 may ordinarily reach temperatures as high as 600° C., the use of more traditional plastic or elastomeric (rubber) sealing elements may not be possible, as such materials cannot withstand exposure to such temperatures in the manner anticipated by use of the pod 10. One solution may be the use of a metal seal fitting 27, 28 disposed between the facing sealing surfaces 12a, 17a of the housing 12 and lid 16, respectively. The metal seal fitting 27, 28 may be formed from a plastically deformable metallic material such as a copper containing alloy or an aluminum containing alloy, as desired, wherein compression of the corresponding metal seal fitting 27, 28 between the facing sealing surfaces 12a, 17a causes the corresponding metal seal fitting 27, 28 to deform to conform to the shape of the facing sealing surfaces 12a, 17a in a fluid-tight manner.

FIG. 11 illustrates one exemplary configuration wherein the metal seal fitting 27 is diamond-shaped and oriented with opposing pointed corners thereof directed in the direction of compression of the metal seal fitting 27 towards each of the facing sealing surfaces 12a, 17a while each of the sealing surfaces 12a, 17a includes a V-shaped groove configured to receive about half of the diamond-shaped metal seal fitting 27 therein, wherein such grooves may include a 90 degree interior angle matching the 90 degree exterior angle of each corner of the metal seal fitting 27. Each of the V-shaped grooves may lead to a receiving area 29 formed in one of the sealing surfaces 12a, 17a and aligned with one of the corners of the metal seal fitting 27 pointed in the compression direction while lateral openings are also present between the facing sealing surfaces 12a, 17a at the remaining two corners arranged perpendicular to the direction of compression. A compression of the metal seal fitting 27 accordingly results in a portion of each corner extending into one of grooves being deformed into a facing one of the receiving areas 29 in a manner promoting an especially strong seal within each such receiving area 29 due to the limited volume available therein, while the remaining corners are also deformed laterally in directions causing such corners to be deformed between opposing pointed corners formed by the facing sealing surfaces 12a, 17a.

The metal seal fitting 28 is provided as a sheet of material extending longitudinally between the facing sealing surfaces 12a, 17a in a direction perpendicular to the direction of compression with one of the facing sealing surfaces 12a, 17a having a V-shaped groove (sealing surface 17a in FIG. 12) formed by an interior corner and straddled by V-shaped exterior corners to each lateral side, and the other of the facing sealing surfaces 12a, 17a having a corresponding V-shaped exterior corner (sealing surface 12a in FIG. 12) directed towards the V-shaped interior corner of the groove. A compression of the metal seal fitting 28 between the facing sealing surfaces 12a, 17a results in the metal seal fitting 28 being deformed to a corrugated configuration wherein the exterior corners of the sealing surfaces 12a, 17a can partially penetrate the metal seal fitting 28 and a portion of the metal seal fitting 28 can be deformed into the interior corner of the V-shaped groove, thereby providing an enhanced sealing effect.

Alternative configurations of the metal seal fittings can also be utilized without departing from the scope of the present invention, including the use of two or more independent metal seal fittings that are provided concurrently between the facing sealing surfaces 12a, 17a, such as utilizing the sheet-like metal seal fitting 28 of FIG. 12 in combination with the diamond-shaped metal seal fitting 27 of FIG. 11, such as positioning one of the metal seal fittings 28 between the metal seal fitting 27 and one or both of the facing sealing surfaces 12a, 17a, as desired.

The use of an effective seal at the junction of the lid 16 and the housing 12 may promote the ability for certain steps of the described flux-free brazing process to be performed when a corresponding one of the pods 10 is remotely positioned relative to a corresponding energy source 30, 45 or system 80, 100 normally associated with heating the interior of the pod 10. For example, the vacuum may be generated in the pod 10 or the heat conductive gas may be introduced into the pod 10 at a remote location before sealing the interior 14 of the pod 10 and then transporting the pod 10 to a desired position for receiving heat energy according to a desired energy source 30, 45.

In some embodiments, one or both of the housing 12 and the lid 16 may be associated with a cooling system (not shown) where a cooling fluid is flowed over an associated surface at or adjacent the sealing surfaces 12a, 17a to result in a reduction of temperature of the corresponding seal, such as one of the disclosed metal seal fittings. Such cooling may occur via supplied air flow, supplied liquid flow, or supplied flow of one of the described heat conductive gases, as desired. In some circumstances, the cooling of the seal and/or sealing surfaces adjacent the seal may result in the ability to utilize the plastic or elastomeric materials previously described as being incompatible with the high temperatures normally associated with operation of the pod 10. Alternatively, a configuration of the pod 10 and the lid 16 thereof may be adjusted to create the formation of a relatively cool zone within the interior 14 of the pod 10 where the lid 16 may be sealed to the remainder of the housing 12 with the expectation that the temperature of the seal between the housing 12 and the lid 16 within the cool zone is below that causing degradation to plastic or elastomeric materials that could form such a seal. With reference back to FIG. 2, such a cold zone may be formed by elongating the interior 14 of the pod 10 such that the workpiece 18 and any heating means thereof are disposed towards one end of the elongated interior 14 such that a temperature gradient forms between opposing ends of the pod 10 in a manner wherein a lower temperature end of the pod 10 forms the described cool zone. The lid 16 or other associated interior access structure 16 may thus form a junction with the housing 12 only at or adjacent this cool zone towards one end of the pod 10, as opposed to be positioned directly above the heated components of the pod 10 as depicted in FIG. 2. Such a configuration may include some form of transport means (not shown) or the like that can be utilized in positioning a workpiece 18 within the cool zone via entry through the interior access structure 16 at a position remote from the corresponding heating means, wherein the workpiece 18 is transported towards the heating means when a brazing process is occurring before being transported back to the cool zone for removal through the interior access structure 16 at the cool zone.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A modular pod for performing a brazing process, the pod comprising:
    a housing defining an interior thereof;
    a vacuum device in selective fluid communication with the interior of the housing and configured to selectively form a vacuum within the interior of the housing;
    a first energy source disposed external to the interior of the housing; and
    a first energy access feature provided through the housing, the first energy access feature forming a pathway for transferring energy from the first energy source to the interior of the housing for heating a workpiece disposed therein in accordance with the brazing process, wherein the first energy access feature is a fluid conveying conduit in fluid communication with each of a first heat exchanger disposed external to the interior of the housing and a second heat exchanger disposed within the interior of the housing, wherein the first energy source is configured to transfer energy to the first heat exchanger and the second heat exchanger is configured to transfer the energy from the first heat exchanger to the interior of the housing.

2. The modular pod of claim 1, further comprising a source of a heat conducting gas in selective fluid communication with the interior of the housing, the source of the heat conducting gas configured to selectively introduce heat conducting gas into the interior of the housing following the vacuum device forming the vacuum therein.

3. The modular pod of claim 1, further comprising a second energy source disposed external to the interior of the housing and a second energy access feature forming a pathway for transferring energy from the second energy source to the interior of the housing for heating the workpiece disposed therein in accordance with the brazing process.

4. A modular pod brazing system comprising:

a plurality of modular pods, each of the modular pods having a housing defining an interior thereof and configured to receive a workpiece therein for performing a brazing process within the interior of the corresponding modular pod;

a solar collection system configured to collect and redirect solar radiation, the solar collection system configured to redirect a portion of the collected solar radiation towards each of the modular pods, wherein the corresponding portion of the collected solar radiation redirected towards each of the modular pods is converted to heat energy utilized in performing the brazing process with respect to the workpiece disposed within the corresponding modular pod, wherein the solar collection system includes a solar collector having a parabolic shape along at least one direction for focusing the solar radiation towards a focal point or region associated with an increased intensity of the solar radiation, wherein the plurality of the modular pods is arranged in an annular array with each of the modular pods disposed radially outwardly relative to a central position of the solar collector, and wherein the solar collection system further comprises a plurality of reflectors configured to redirect each portion of the collected solar radiation originating from the solar collector in a radially outward direction towards each of the modular pods forming the annular array.

5. A modular pod brazing system comprising:

a plurality of modular pods, each of the modular pods having a housing defining an interior thereof and configured to receive a workpiece therein for performing a brazing process within the interior of the corresponding modular pod; and a solar collection system configured to collect and redirect solar radiation, the solar collection system configured to redirect a portion of the collected solar radiation towards each of the modular pods, wherein the corresponding portion of the collected solar radiation redirected towards each of the modular pods is converted to heat energy utilized in performing the brazing process with respect to the workpiece disposed within the corresponding modular pod, wherein the solar collection system includes a solar collector having a parabolic shape along at least one direction for focusing the solar radiation towards a focal point or region associated with an increased intensity of the solar radiation, wherein the plurality of the modular pods is arranged in an annular array with each of the modular pods disposed radially outwardly relative to a central position of the solar collector, wherein a shade positioned to selectively obstruct the portion of the collected solar radiation redirected towards a first one of the plurality of the modular pods forming the annular array is provided, and wherein one of the shade or the annular array of the modular pods is configured to orbit relative to the central position of the solar collector to result in the shade being positioned to selectively obstruct the portion of the collected solar radiation redirected towards a second one of the plurality of the modular pods forming the annular array that is different from the first one of the plurality of the modular pods.

6. The modular pod brazing system of claim 4, further comprising one or both of a vacuum device in selective fluid communication with the interior of each of the plurality of the modular pods and a source of heat conductive gas in selective fluid communication with the interior of each of the plurality of the modular pods.

7. The modular pod brazing system of claim 4, wherein the plurality of the modular pods includes a first modular pod and a second modular pod, wherein the first modular pod includes at least one of a different configuration of the interior of the housing thereof, a different volume of the interior of the housing thereof, a different structure of the workpiece disposed therein, a different brazing process occurring therein, a different secondary energy source supplementing the solar radiation in performing the brazing process therein, or a different method of converting the solar radiation to the heat energy utilized in performing the brazing process therein in comparison to the second modular pod.

\* \* \* \* \*